United States Patent
Dupmeier et al.

(10) Patent No.: US 12,053,833 B2
(45) Date of Patent: Aug. 6, 2024

(54) METHOD AND HOT-FORMING DIE FOR PRODUCING A HEAT TRANSFER PLATE

(71) Applicant: BENTELER AUTOMOBILTECHNIK GMBH, Paderborn (DE)

(72) Inventors: Tobias Dupmeier, Paderborn (DE); Guenter Fortmeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/094,465

(22) Filed: Jan. 9, 2023

(65) Prior Publication Data
US 2023/0219155 A1 Jul. 13, 2023

(30) Foreign Application Priority Data
Jan. 10, 2022 (EP) .................................... 22150775

(51) Int. Cl.
*B23K 1/00* (2006.01)
*B23K 3/04* (2006.01)
(Continued)

(52) U.S. Cl.
CPC .............. *B23K 1/0012* (2013.01); *B23K 3/04* (2013.01); *B23K 3/085* (2013.01); *B23P 15/26* (2013.01); *B23K 2101/14* (2018.08)

(58) Field of Classification Search
CPC ........ B23K 1/0012; B23K 3/04; B23K 3/085; B23K 2101/14; B23K 20/023;
(Continued)

(56) References Cited

U.S. PATENT DOCUMENTS 6,367,152 B1 * 4/2002 Kataoka ................. B23P 15/26
165/185
2001/0030043 A1 * 10/2001 Gleisle ................... F28D 9/005
165/167
(Continued)

FOREIGN PATENT DOCUMENTS

CN 112247354 A * 1/2021 ............. B23K 26/21
DE 102013008609 A1 11/2014
(Continued)

OTHER PUBLICATIONS

Extended European Search Report of European Application No. 22150775.9 mailed Jun. 29, 2022; 5pp.

*Primary Examiner* — Kiley S Stoner
(74) *Attorney, Agent, or Firm* — HAUPTMAN HAM, LLP (57) ABSTRACT

A hot-forming die has a heatable lower die and a heatable upper die. The lower die and the upper die have spacer elements to permit flexing. A plate stack including two plate elements is inside the hot-forming die. The plate stack is on the spacer elements in the lower die. The lower die and the upper die are displaced relative to each other when the hot-forming die is closed. The spacer elements of the upper die come into contact with the plate stack. As the closing movement continues, the spacer elements, are displaced into the lower die and the upper die, respectively, and the plate stack is clamped between the lower die and the upper die. The plate stack is then heated by the lower die and the upper die and an internal pressure is applied to an intermediate space between the plate elements by feeding in an active medium.

14 Claims, 7 Drawing Sheets

(51) Int. Cl.
  *B23K 3/08* (2006.01)
  *B23P 15/26* (2006.01)
  *B23K 101/14* (2006.01)
(58) Field of Classification Search
  CPC . B23K 20/26; B23K 37/04–047; B23P 15/26; B21D 37/16; B21D 45/02; B21D 53/045
  USPC .................................... 228/44.3, 47.1, 49.4
  See application file for complete search history.

(56) References Cited

U.S. PATENT DOCUMENTS

| | | | | |
|---|---|---|---|---|
| 2008/0105408 | A1* | 5/2008 | Zhang | B23K 1/0012 257/E23.099 |
| 2014/0295205 | A1 | 10/2014 | Ota et al. | |
| 2015/0086831 | A1 | 3/2015 | Haussmann | |
| 2017/0179555 | A1 | 6/2017 | Foerster et al. | |
| 2020/0355442 | A1* | 11/2020 | Lewis | F03G 7/065 |
| 2021/0354224 | A1* | 11/2021 | Seiwert | F28D 9/0062 |
| 2022/0152717 | A1* | 5/2022 | Abraham | B23K 1/0012 |

FOREIGN PATENT DOCUMENTS

| | | | | |
|---|---|---|---|---|
| DE | 102014217728 A1 | | 3/2016 | |
| DE | 102015216719 A1 | | 3/2017 | |
| EP | 1180403 A1 | * | 2/2002 | ........... B21C 37/151 |
| EP | 2828922 A1 | | 1/2015 | |
| EP | 3771878 A2 | | 2/2021 | |
| EP | 1094291 A2 | * | 4/2021 | ........... B23K 1/0012 |
| FR | 3101267 A3 | * | 4/2021 | ............ B21D 13/02 |
| GB | 1495655 A | | 12/1977 | |
| WO | WO-2004033978 A1 | * | 4/2004 | .............. B23P 15/26 |

\* cited by examiner

METHOD AND HOT-FORMING DIE FOR PRODUCING A HEAT TRANSFER PLATE

RELATED APPLICATIONS

The present application claims priority of European Application Number 22 150 775.9 filed Jan. 10, 2022, the disclosure of which is hereby incorporated by reference herein in its entirety.

The invention relates to a method and a hot-forming die for producing a heat transfer plate.

A heat transfer plate of the type in question here is in particular a cooling plate for cooling batteries.

In electric vehicles, be it pure electric-powered vehicles, hybrid vehicles, or plug-in hybrid vehicles, rechargeable batteries are used which have a plurality of electrical storage cells connected in series and/or in parallel. Electrical storage cells can here be combined to form battery modules from which the battery is constructed.

The batteries are sensitive in terms of a different temperature distribution, which can cause overheating and premature ageing. Cooling devices are used in order to maintain the batteries within an optimum temperature range. It is intended that these ensure that unrequired waste heat which occurs when the batteries are operating is dissipated from the batteries and the temperature of the battery is regulated to a constant temperature level.

Heat transfer plates which contact the batteries directly or indirectly are used to cool batteries and battery modules. A cooling fluid flows through the heat transfer plates. Heat transfer plates usually consist of two plate elements which, when placed together and joined, delimit one or more ducts situated between them. The heat transfer plates are often manufactured from light metal sheets, in particular aluminum sheets. Depending on the structure and performance, heat transfer plate assemblies are also attached above and below the batteries for cooling purposes.

A cooling device for a vehicle battery with a heat transfer plate or a cooling plate from EP 2 828 922 B1 forms part of the prior art.

A cooling plate is known from DE 10 2015 216 719 A1. A cooling duct and an inlet, communicating therewith, and an outlet are arranged in the cooling plate. A connection piece, which is damped between the upper part and the lower part of the cooling plate, is provided in each case in the region of the inlet and the outlet, A cooling plate for cooling a battery with a structure plate and a cover plate is described in DE 10 2014 217 728 A1.

A method for producing a heat transfer plate or a plate heat exchanger is disclosed in EP 3 771 878 A2. For this purpose, a plate stack is provided which is formed from at least two plate elements made from a metal material with a brazing material arranged between the plate elements. The plate stack is then heated to a first temperature and subsequently placed inside a die, the forming surfaces of which have cavities for intended duct structures. The duct structures are formed by local deformation, using internal pressure, in at least one plate element. The plate stack is then heated to a second temperature and the plate elements of the plate stack joined by being brazed at the surfaces bearing against one another.

Starting from the prior art, the object of the invention is to improve and make more efficient a method for producing a heat transfer plate and to demonstrate a hot-forming die, which is improved in terms of technical equipment, for producing a heat transfer plate.

The solution of the part of the object relating to the method consists of a method as claimed in claim 1.

A hot-forming die for producing a heat transfer plate is the subject of claim 15.

Advantageous developments and embodiments are the subject of the dependent claims.

A method for producing a heat transfer plate, in particular a cooling plate, has the following steps:
Providing a plate stack which is formed from at least two plate elements made from a metal material with a brazing material arranged between the plate elements;
Transferring the plate stack into a heated hot-forming die which has a lower die and an upper die and contact surfaces with at least one duct cavity;
Placing the plate stack inside the hot-forming die, wherein the plate stack is positioned on spacer elements which are arranged so that they can flex in the lower die and project relative to the contact surface of the lower die;
Closing the hot-forming die, wherein the lower die and the upper die are displaced relative to each other;
Continuing the closing movement and clamping the plate stack between the lower die and the upper die, wherein the spacer elements in the lower die are displaced into the lower die and the plate stack comes into surface contact with the lower die and the upper die;
Heating the plate stack, and
Applying an internal pressure to an intermediate space between the plate elements of the plate stack by feeding in an active medium and constituting a duct by deforming, using internal pressure, at least one plate element region into the duct cavity, the duct cavity being vented, and
Melting the brazing material between the plate elements and joining by brazing the plate elements at joining surfaces of the plate elements which bear against one another;
Opening the hot-forming die, wherein the lower die and the upper die are displaced relative to each other, wherein the spacer elements in the lower die are moved out from the lower die such that the plate stack is held on the spacer elements in the lower die with a spacing from the lower die;
Holding and cooling the plate stack;
Opening the hot-forming die until it is in a removal position and removing the heat transfer plate from the hot-forming die.

The method according to the invention is improved technically and enables high-quality heat transfer plates to be produced efficiently. The production of heat transfer plates is optimized from a technical production point of view and for the operational use of the heat transfer plates.

The hot-forming die has a heatable lower die and a heatable upper die. The hot-forming die is heated to a die temperature in order to produce the heat transfer plates.

A plate stack is constituted from at least two plate elements made from a metal material. A brazing material is arranged or applied between the plate elements.

When or after constituting the plate stack, the latter can be provided with a fluid connector in the form of a connection piece. The connection piece can be inserted, for example, through a connecting opening in one of the plate elements.

The plate stack is then placed in the forming die. The plate stack is here positioned on spacer elements. When it is placed inside, the plate stack consequently does not yet come into contact with the heated and temperature-regulated lower die. The spacer elements project relative to contact surfaces of the lower die. This measure is an advantageous aspect of the method according to the invention and contributes substantially to the efficient production of the heat transfer plates.

After the plate stack has been arranged and positioned on the spacer elements, the hot-forming die is closed. The lower die and the upper die are displaced relative to each other in order to do this. In particular, the upper die is lowered onto the lower die. During the closing movement, the plate stack is held and clamped between the lower die and the upper die, As the closing movement continues, the spacer elements in the lower die are displaced into the lower die, wherein the plate stack comes into surface contact with the lower die and the upper die.

The plate stack is heated in the hot-forming die.

Internal pressure is applied to an intermediate space between the plate elements of the plate stack. An intermediate space is a region between plate elements which lie on top of each other, wherein there is no need for a gap to be present between the plate elements in the region of the intermediate space. An internal pressure is applied to the intermediate space by feeding an active medium into the intermediate space. A duct is here formed by deforming at least one plate element region using internal pressure into the duct cavity in the contact surface or surfaces of the hot-forming die. The duct cavity is vented during the deformation using internal pressure and the formation of the duct. The venting effects pressure equalization. This measure is also an essential and advantageous aspect of the method according to the invention.

The brazing material is melted by the die temperature of the forming die between the plate elements and the plate elements are joined at the joining surfaces of the plate elements which bear against one another by being brazed.

The hot-forming die is then opened, wherein the lower die and the upper die are displaced relative to each other and moved apart from each other. During the opening movement, the spacer elements in the lower die move out of the lower die such that the plate stack is held on the spacer elements in the lower die with a spacing from the lower die. The plate stack is raised by the spacer elements in the lower die.

The joined hot plate stack is held so that it lies on the spacer elements and is cooled. The hot-forming die is in parallel opened further until it is in a removal position. The heat transfer plate can then be removed from the hot-forming die.

Holding the plate stack on the spacer elements after the deforming procedure is also an advantageous aspect of the method according to the invention. After the hot-forming die has been opened, the plate stack lies on the spacer elements. The plate stack is spaced apart from the lower die which is at a certain temperature by the spacer elements. When the hot-forming die is opened, the spacer elements move automatically or by being controlled out of the lower die. The plate stack is raised gently and carefully from the lower die.

The melted brazing material between the plate elements can cool further. The risk of the plate stack moving uncontrollably when the hot-forming die is opened and the plate elements being displaced, for example, because of encrusted material is prevented.

The upper die also particularly advantageously has spacer elements which are arranged so that they can flex in the upper die. The spacer elements of the upper die project relative to the contact surfaces of the upper die. When the plate stack is placed inside the hot-forming die, it is positioned on the spacer elements in the lower die. The plate stack lies on the spacer elements in the lower die with a spacing from the lower die. When the hot-forming die is closed, the spacer elements of the upper die which project relative to the contact surface of the upper die come into contact with the plate stack.

The spacer elements in the upper die are displaced into the upper die when the hot-forming die is closed.

When the hot-forming die is opened, the spacer elements in the upper die are moved out from the upper die. The spacer elements are here in contact with the plate stack. The spacer elements in the upper die contact the plate stack and hold the hot plate stack in position.

Both the spacer elements in the lower die and the spacer elements in the upper die are configured to automatically move out from their holders in the lower die and the upper die, respectively. For this purpose, the spacer elements are equipped with actuators or can be moved by drive elements. For example, the spacer elements can interact with spring elements. An actuator mechanism with actuators can comprise an activating bar running longitudinally or transversely through the lower die and/or the upper die and which interacts in each case with the spacer elements arranged in a row. The activating bar for its part is activated by linear drives, in particular piston-cylinder units.

The hot-forming die is heated to a die temperature at which both the deforming procedure and the brazing joining procedure are performed. In particular, the die temperature is between 540° C. and 670° C. The die temperature is particularly advantageously between 550° C. and 640° C.

A further aspect of the invention provides that a plate element is provided with a fluid connector before the plate stack is constituted, the plate elements are provided with a fluid connector during the constitution of the plate stack, or the plate stack is provided with a fluid connector once constituted.

The active medium for forming the duct s in particular fed in via the fluid connector.

The plate stack is clamped between the lower die and the upper die during the production of the heat transfer plates. During the deformation, using internal pressure, and constitution of the duct, the plate stack is sealed peripherally along edge regions which lie on top of one another and/or adjacent to the duct cavity by means of one or more pressure elements. The pressure elements can be constituted by a corresponding contouring in the forming surfaces of the lower die and/or the upper die, for example by sealing beads. The sealing elements can be provided peripherally along edge regions which lie on top of one another of the upper die and/or the lower die. Sealing elements can furthermore be provided adjacent to the duct cavity. The sealing elements ensure a particularly advantageous deforming procedure and in particular that the deforming procedure takes place in the region of the duct cavity. In this way, high dimensional accuracy and deformation accuracy are ensured.

The plate elements are made of metal. In particular, the plate elements are made of a light metal material and here in particular of an aluminum alloy.

In the method according to the invention, plate elements are preferably and effectively used which are provided with a brazing material, wherein the brazing material is applied to a plate element in the form of a plated brazing layer.

It can furthermore be provided in the method according to the invention that, when the plate stack is clamped and held between the lower die and the upper die, an oxide layer present on a surface of the plate element is broken up. This can be effected in particular by mechanical means for breaking up the oxide layer.

A further advantageous aspect consists in the joining by brazing being performed with no flux, i.e. flux-free.

As already mentioned, the spacer elements can be displaced automatically or by actuators.

The production according to the invention of heat transfer plates can furthermore be improved if a release agent is applied between the contact surfaces of the hot-forming die and the outer surfaces of the plate elements or the plate stack.

The spacer elements arranged in the lower die have a lower limit stop. The spacer elements arranged in the upper die have an upper limit stop. The lower limit stop and the upper limit stop limit the respective displacement travel of the spacer elements out from the lower die and the upper die, respectively, and thus define the end position of the spacer elements and hence the position of a plate stack when the latter is held, positioned on the lower spacer elements, between the lower spacer elements and the upper spacer elements.

The lower limit stop and the upper limit stop can be adjustable. In this way, adaptation to plate stacks of different thickness is possible.

Figure 1:
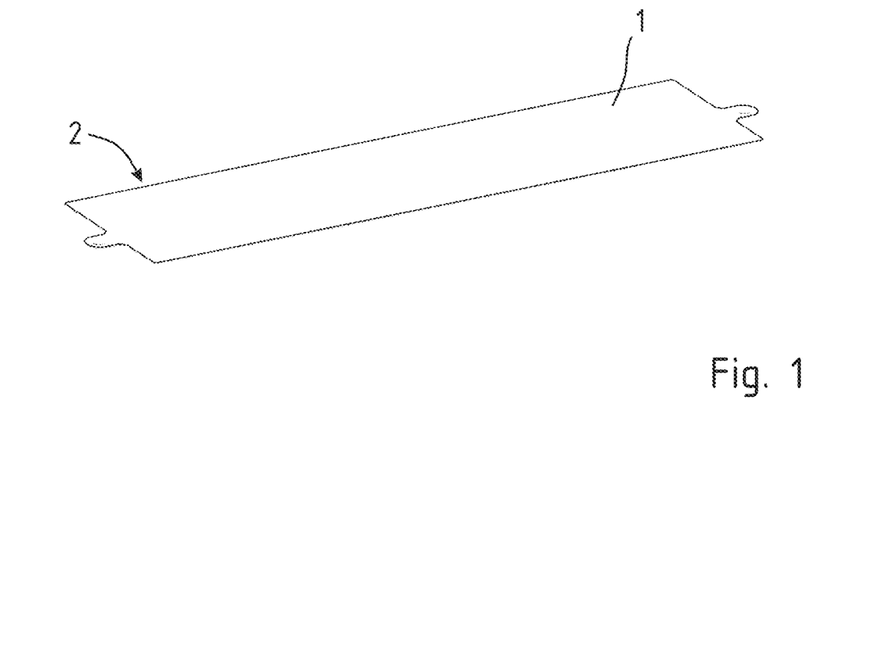
FIG. 1 shows a perspective view of a plate element for constituting a plate stack.

The invention is described in detail below with the aid of drawings, in which:

FIG. 1 shows a prefabricated plate element 1 made from light metal. In particular, the plate element 1 is made from a light metal material, preferably from aluminum or an aluminum alloy.

Two such plate elements 1 are positioned flat on top of each other and constitute a plate stack 2. The surfaces of the plate elements 1 which lie on top of each other are provided wholly or in some places with a brazing material. In particular, a brazing material in the form of a plated brazing layer is applied to a plate element 1.

Figure 2:
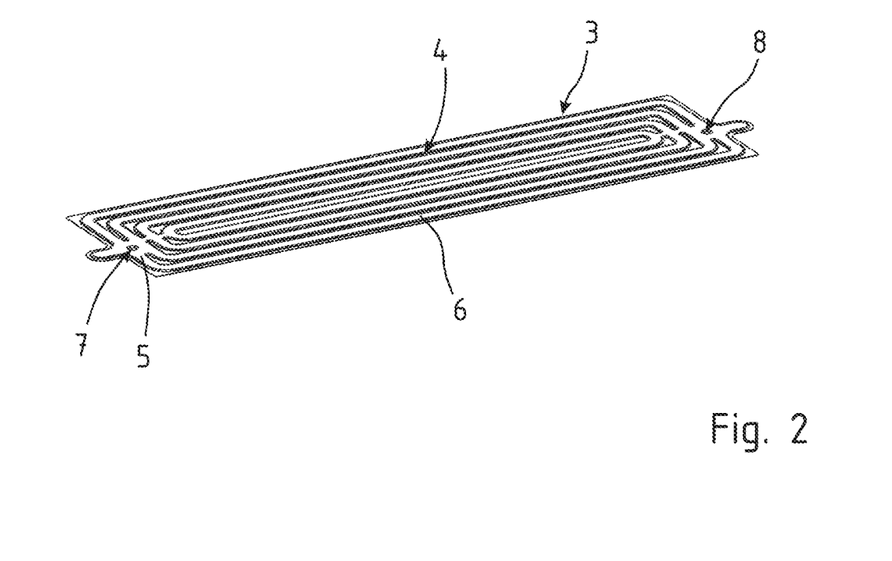
FIG. 2 shows, also in a perspective illustration, a heat transfer plate.
Figure 3:
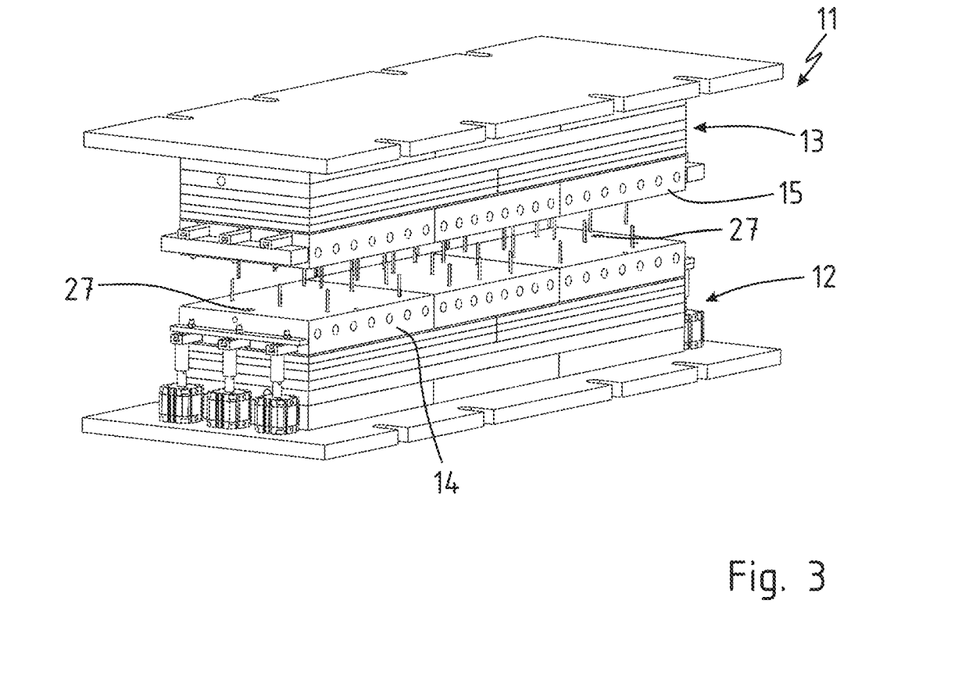
FIG. 3 shows a hot-forming die.
Figure 4:
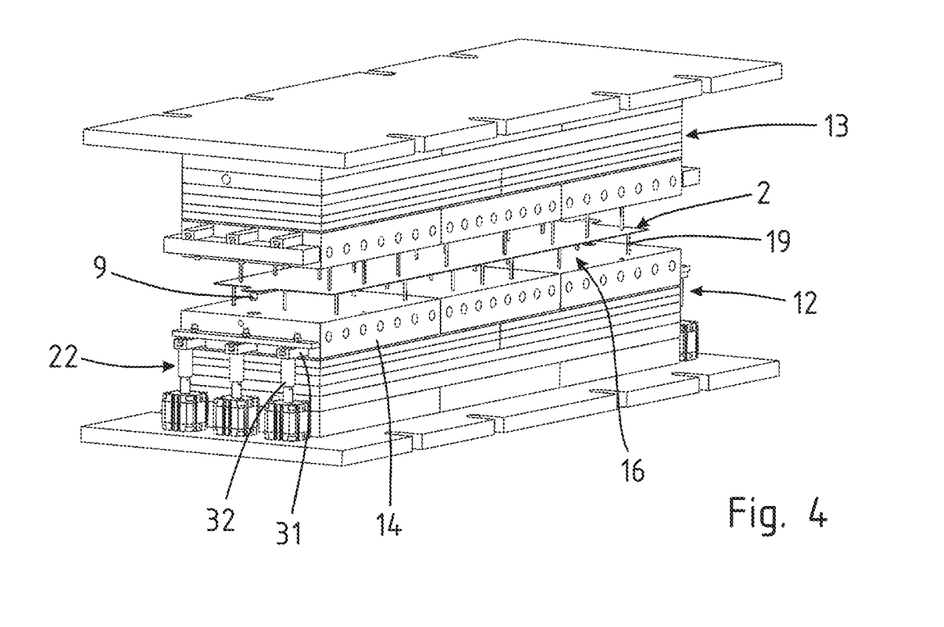
FIG. 4 shows the hot-forming die with a plate stack held between the lower die and the upper die.

FIG. 2 shows a heat transfer plate 3 which is produced from a plate stack 2. The plate stack 2 is constituted from a first plate element 1 and a second plate element 1. The heat transfer plate 3 and its plate stack 2 have a duct structure 4 with at least one duct 5. Duct sections 6 of the duct 5 run in loops inside one another and communicate between fluid connectors 7, 8. A fluid connector 7 with a connection piece 9 is specified for the supply of a cooling fluid and a fluid connector 8 with a connection piece 10 is specified for removing a cooling fluid. The connection pieces 9 and 10 can be seen in the illustrations in FIGS. 6, 7, 10, and 11.

Figure 13:
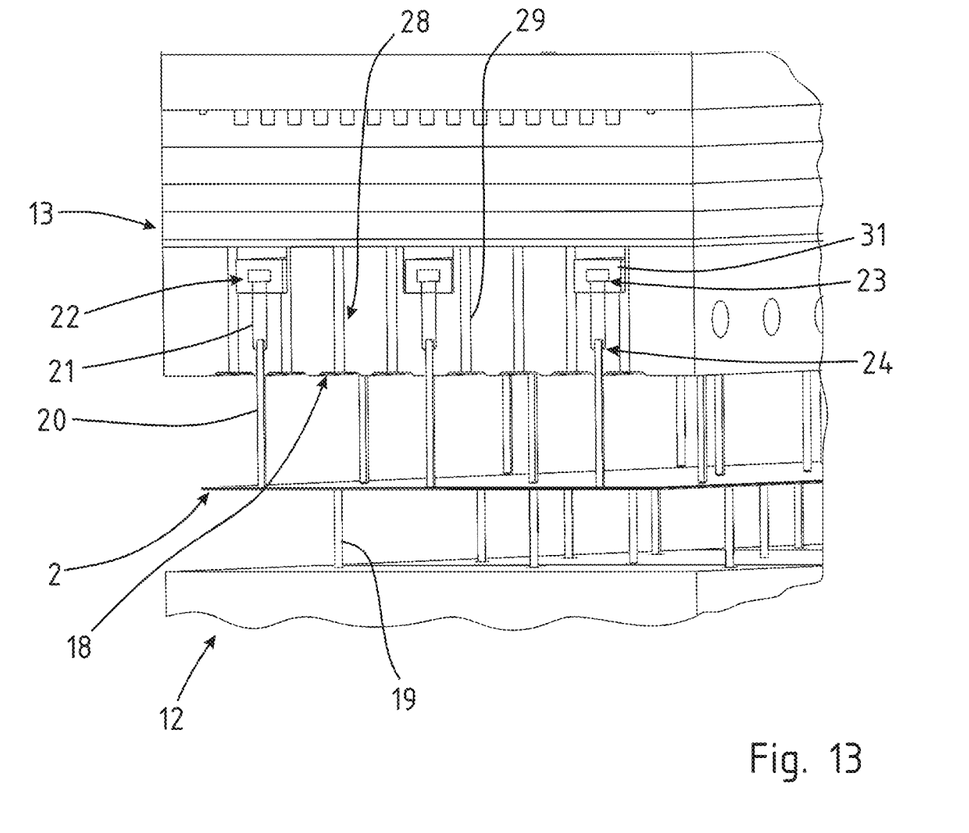
FIG. 13 shows a detail of the hot-forming die in an enlarged illustration.

A hot-forming die 11 for producing a heat transfer plate 3 is illustrated in FIGS. 3 to 12. A detail of the hot-forming die 11 is shown in FIG. 13. The illustrations of the hot-forming die 11 are shown schematically from a technical point of view. For explanatory reasons, regions of the outer walls, the insulation, and the housing have not been illustrated.

The hot-forming die 11 has a heatable lower die 12 and a heatable upper die 13. The lower die 12 and the upper die 13 are segmented and are in each case composed of die segments 14 and 15. The lower die 12 and the upper die 13 have contact surfaces 16, 17. A duct cavity 18 is provided in at least one contact surface 17. This can be seen in FIG. 8. The duct cavity 18 is provided in the contact surface 17 of the upper die 13. The contact surface 16 in the lower die 12 is level and smooth and has no duct cavity.

The lower die 12 has spacer elements 19 which are arranged so that they can flex and be displaced to a limited extent in the lower die 12. The upper die 13 also has spacer elements 20. The spacer elements 20 of the upper die 13 are arranged so that they can flex and be displaced to a limited extent in the upper die 13. The spacer elements 19 in the lower die 12 and the spacer elements 20 in the upper die 13 can be displaced relative to the contact surfaces 16, 17.

The spacer elements 19 and 20 have a pin-shaped design and are each arranged so that they are guided in a holder 21 in the lower die 12 and in the upper die 13, respectively. The spacer elements 19, 20 each interact with actuators 22 which effect a movement of the spacer elements 19, 20 out from the holders 21. The actuators 22 can be spring elements or linear drives. The spacer elements 19, 20 can be displaced counter to the force of the actuators 22 when the hot-forming die 11 is closed or by the lower die 12 and the upper die 13. The retracting or extending travel of the spacer elements 19, 20 in the holders 21 is limited by an upper limit stop 23 and a lower limit stop 24.

When the hot-forming die 11 is open, the lower die 12 and the upper die 13 having been moved apart from each other, the spacer elements 19 of the lower die 12 project relative to the contact surface 16 of the lower die 12 and the spacer elements 20 of the upper die 13 project relative to the contact surface 17 in the upper die 13.

Figure 5:
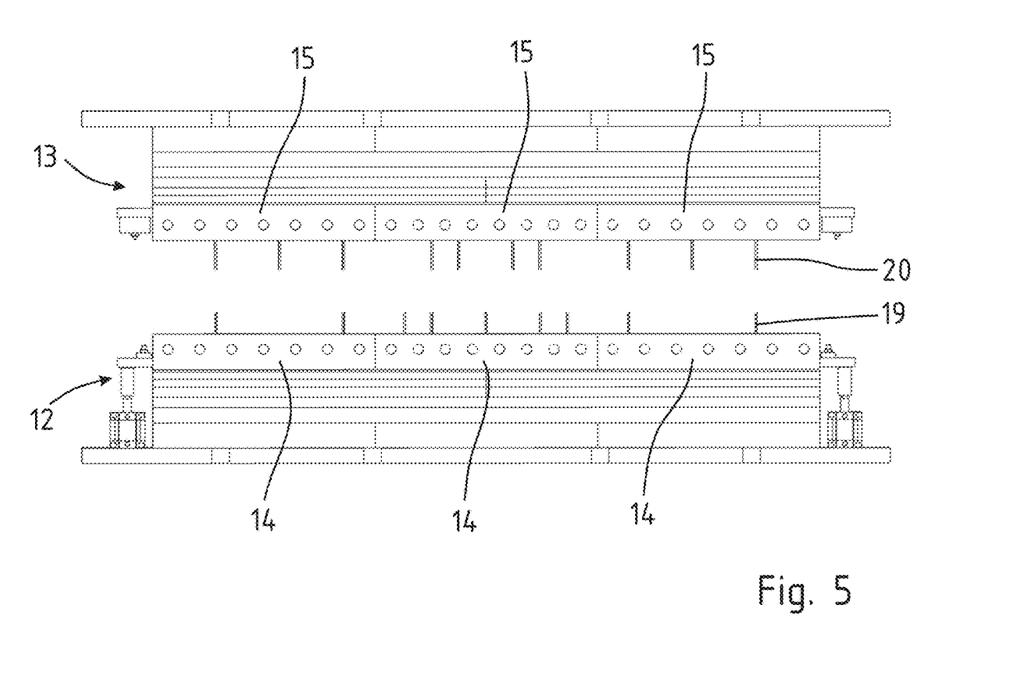
FIG. 5 shows the hot-forming die according to the illustration in FIG. 3 in a side view.
Figure 6:
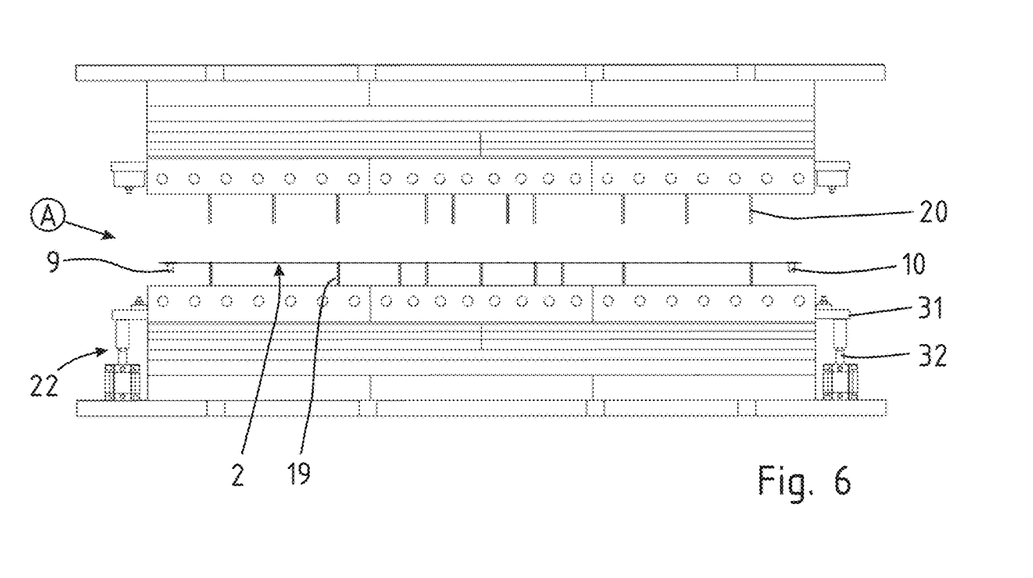
FIG. 6 shows the hot-forming die with a plate stack placed inside in a side view with the upper die open.
Figure 7:
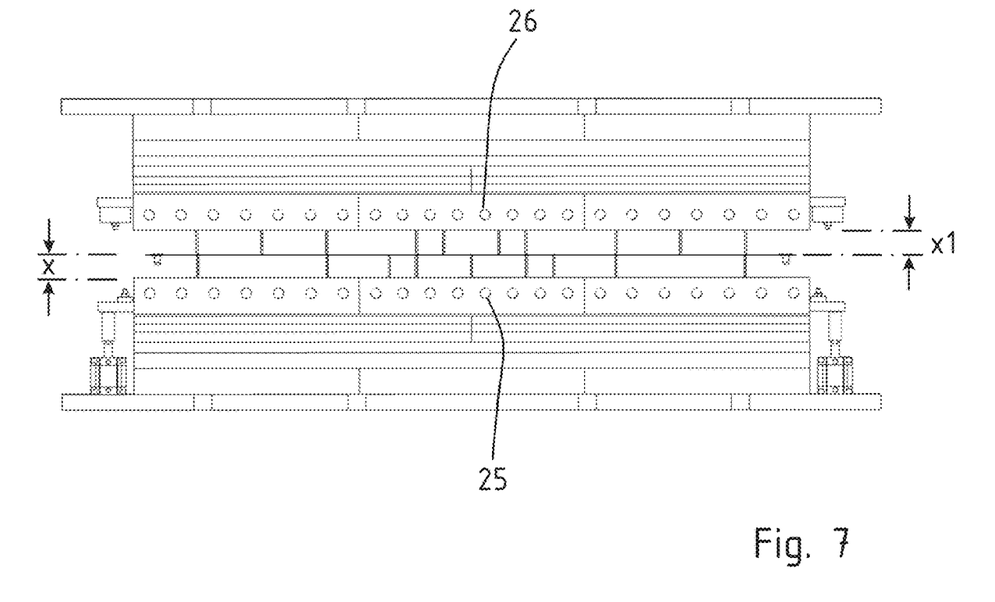
FIG. 7 shows the hot-forming die, also in a side view, with the upper die which is more closed.
Figure 8:
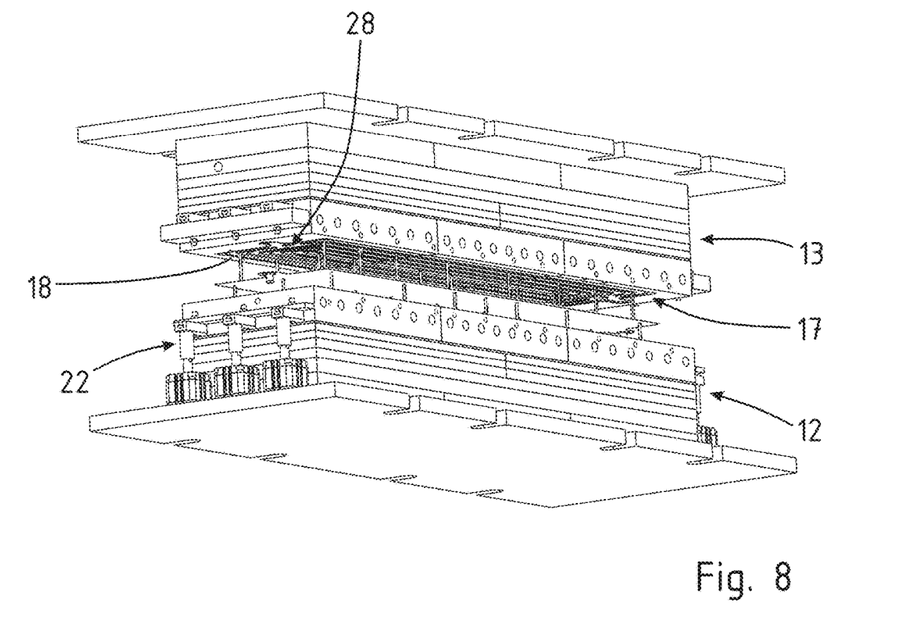
FIG. 8 shows the hot-forming die according to the illustration in FIG. 7 in a perspective view.

A spaced-apart position A, in which the spacer elements 19 of the lower die 12 and the spacer elements 20 of the upper die 13 have been displaced out from the lower die 12 and the upper die 13 and project relative to the contact surfaces 16, 17 is shown, for example, in FIG. 5 and 6 or 13.

Figure 9:
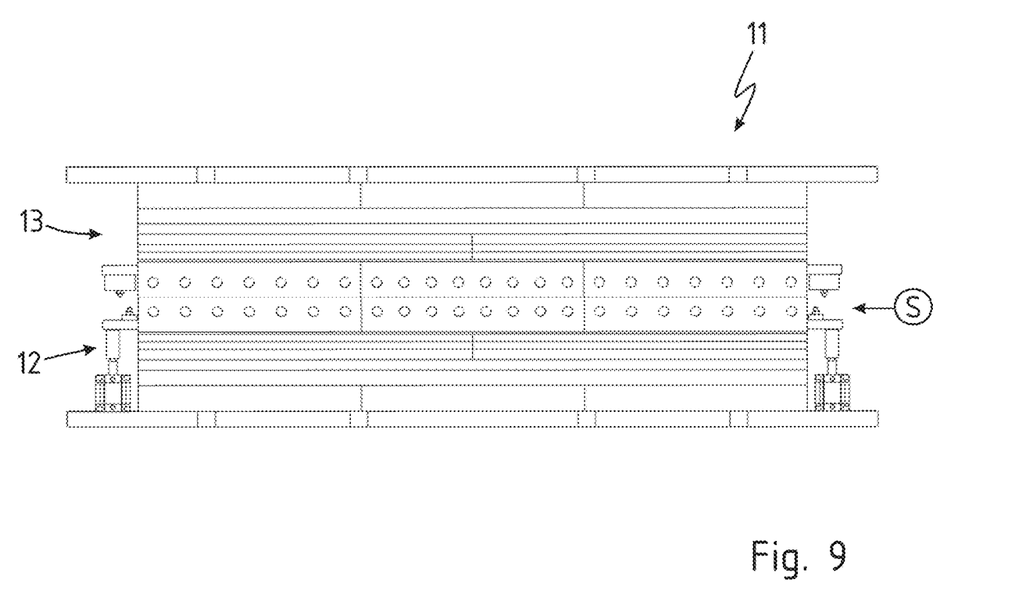
FIG. 9 shows the hot-forming die in a side view in the closed state.
Figure 10:
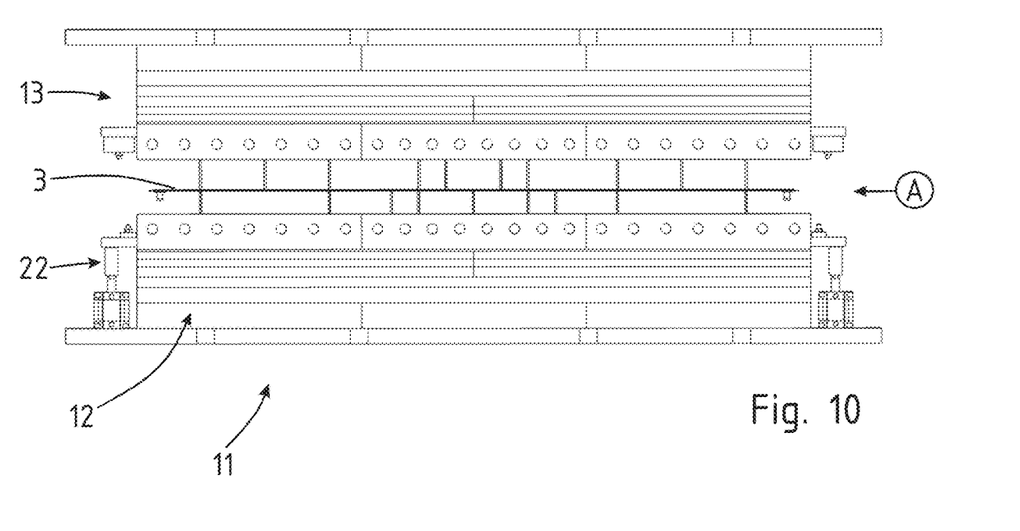
FIG. 10 shows the hot-forming die after the deformation procedure in a first open position.
Figure 11:
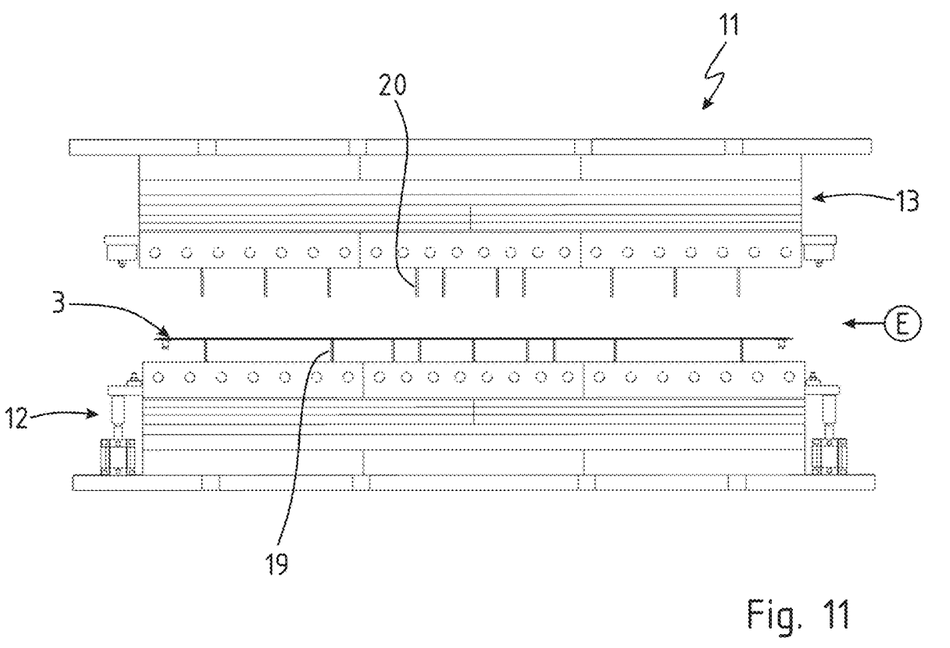
FIG. 11 shows the hot-forming die after the deformation procedure in a second open position.
Figure 12:
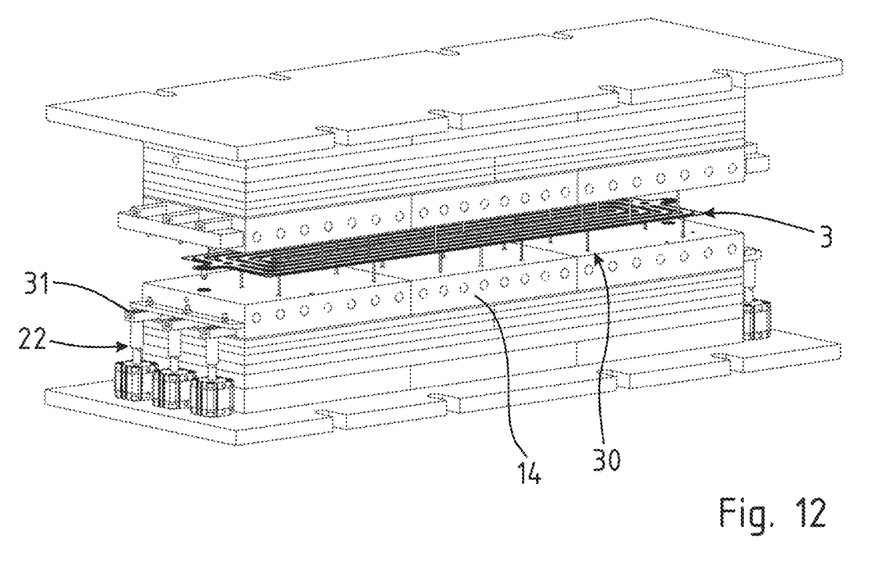
FIG. 12 shows the hot-forming die after the deformation procedure in a perspective view.

A closed position S with the lower die 12 and the upper die 13 closed, in which the spacer elements 19 of the lower die 12 are accommodated in the lower die 12 and the spacer elements 20 of the upper die 13 are accommodated in the upper die 13 is shown in FIG. 9.

In order to produce a heat transfer plate 3, a plate stack 2 constituted of two plate elements 1 is placed inside the hot-forming die 11. The spacer elements 19 in the lower die 12 project relative to the contact surfaces 16 of the lower die 12. The plate stack 2 is positioned on the spacer elements 19 in the lower die 12.

The hot-forming die 11 and its lower die 12 and upper die 13 are heated to a die temperature TW between 540° C. and 670° C. In particular, the die temperature TW is between 550° C. and 640° C. The hot-forming die 11 is equipped with a heating device for heating the lower die 12 and upper die 13. Heating ducts 25 are provided in the lower die 12 and heating ducts 26 are provided in the upper die 13. The lower die 12 has a respective recess 27 in which a connection piece 9 and 10, respectively, can be accommodated with the hot-forming die 11 closed.

A brazing material is applied between the surfaces of the plate elements 1 of the plate stack 2 which lie on top of each other. For this purpose, in particular a plate element 1 is provided on one side with a plated brazing layer.

Before the plate stack 2 is placed inside the hot-forming die 11, the contact surface 16 and/or the contact surface 17 of the lower die 12 and upper die 13, respectively, and/or the underside of the plate stack 2 have been provided with a release agent.

The plate stack 2 constituted from two plate elements 1 is placed inside the hot-forming die 11. FIG. 6 shows a spaced-apart position A in which the plate stack 2 lies on the spacer elements 19 with a spacing X from the lower die 12. After the plate stack 2 has been placed inside the hot-forming die 11 and positioned on the lower spacer elements 19 of the lower die 12, the hot-forming die 11 is closed. The upper spacer elements 20 in the upper die 13 project relative to the contact surface 17 of the upper die 13. When the hot-forming die 11 is closed, the lower die 12 and the upper die 13 are displaced relative to each other and moved toward each other. The projecting spacer elements 20 of the upper die 13 here come into contact with the upper side of the plate stack 2. The plate stack 2 is consequently held between the spacer elements 19, 20 between the lower die 12 and the upper die 13 with a spacing x from the lower die 12 and with a spacing x1 from the upper die 13. In this way, it is ensured that, when it is placed inside the hot-forming die 11, the plate stack 2 does not directly come into direct contact with the lower die 12.

As the closing movement continues, the upper die 13 is moved further in the direction of the lower die 12. During the closing movement, the spacer elements 19 of the lower die 12 are displaced into the lower die 12 and the spacer elements 20 of the upper die 13 are displaced into the upper die 13. To do this, the respective spacer elements 19, 20 are pushed into the holders 21 in the lower die 12 and in the upper die 13, respectively.

The plate stack 2 is clamped between the lower die 12 and the upper die 13. The plate stack 2 thus lies with its underside in surface contact with the lower die 12 and with its upper side in surface contact with the upper die 13. When the plate stack 2 is clamped and held between the lower die 12 and the upper die 13, an oxide layer present on an upper surface of a plate element 1 can be broken up. Mechanical breaking elements configured for this purpose can be provided to do this.

When the hot-forming die 11 has been closed, the plate stack 2 clamped between the lower die 12 and the upper die 13 is heated. An internal pressure is applied to an intermediate space between the plate elements 1. This is caused by feeding an active medium into the intermediate space between the plate elements 1. A duct 5 is constituted as a result by deformation using internal pressure. During the forming of the duct, a plate element region of the upper plate element 1 is formed into the duct cavity 18 in the upper die 13. The duct cavity 18 of the hot-forming die 11 is vented to the outside during the forming of the duct. A vent 28 is provided for this purpose. The vent 28 has venting bores 29 which communicate with the duct cavity 18. Air can be drawn off and hence the pressure can also be equalized over the gaps between the die segments 15 of the upper die 13. The vent 28 ensures that air can escape from the duct cavity 18 in the upper die 13, whilst the duct 5 in the plate element is being formed. The vent 28 causes the material in the plate element region of the upper plate element 1 along the duct cavity 18 to be formed into the latter with no resistance and the duct 5 can be formed.

During the deformation using internal pressure, the plate stack 2 can be sealed by means of one or more pressure elements peripherally along edge regions 30 which lie on top of each other and/or adjacent to the duct cavity 18. To do this, the hot-forming die 11 or its lower die 12 and/or upper die 13 is equipped with pressure elements which are provided and specified to seal the plate stack 2 peripherally along the outer edge region 30 and/or adjacent to the duct cavity 18. Such pressure elements can take the form of, for example, bead-shaped bodies.

The brazing material applied between the plate elements 1 melts or is melted when the plate elements 1 are heated.

After the duct structure 4 with the duct 5 has been formed, the hot-forming die 11 is opened. When the hot-forming die 11 is opened, the lower die 12 and the upper die 13 are displaced relative to each other. The upper die 13 is moved away from the lower die 12, the spacer elements 19 of the lower die 12 being moved out from the lower die 12 and the spacer elements 20 of the upper die 13 out from the upper die 13 simultaneously. The joined plate stack 2 is held on the lower spacer elements 19 in the lower die 12 with a spacing x from the lower die 12. The spacer elements 20 of the upper die 13 are moved out from the upper die 13 and contact the upper side of the plate stack 2. The plate stack 2 provided with the duct structure 4 is held between the spacer elements 19, 20 and can cool down. The melted brazing material sets and the plate elements 1 of the plate stack 2 are joined by being brazed.

When the hot-forming die 11 is opened, the upper die 13 is moved away from the lower die 12 and the plate stack 2. At the same time, the spacer elements 20 of the upper die 13 are moved out from the latter and remain in contact with the upper side of the plate stack 2. The upper spacer elements 20 hold and fix the plate stack 2 during the opening movement of the hot-forming die 11 whilst the plate stack 2 and the finished formed heat transfer plate 3 is raised from the lower die 12 by the lower spacer elements 19.

The hot-forming die 11 is opened further. The upper die 13 is here moved further away from the lower die 12. The hot-forming die 11 is opened until it is in a removal position (see FIG. 11) and the heat transfer plate 3 can be removed from the hot-forming die 11.

The actuators 22 are specified and configured for displacing the spacer elements 19 and 20 in the guides in the lower die 12 and in the upper die 13, respectively. The actuators 22 of the actuator device of the lower die 12 interact with the spacer elements 19 and raise the heat transfer plate 3 after the hot-forming procedure and the hot-forming die 11 has been opened. The spacer elements 20 of the upper die 13 which act against the heat transfer plate 3 from above hold the heat transfer plate 3 in position when the hot-forming die 11 is being opened and during the cooling procedure. The actuators 22 each have an activating bar 31 running longitudinally through the lower die 12 and interact with the spacer elements 19 of the lower die 12. The activating bars 31 are activated by linear drives 32 which engage on the outside free ends of the activating bars 31.

The spacer elements 19, 20 are activated automatically or by being controlled depending on the movement of the lower die 12 and the upper die 13 or are activated and/or controlled by the lower die 12 and the upper die 13.

REFERENCE SYMBOLS

1—plate element
2—plate stack

3—heat transfer plate
4—duct structure
5—duct
6—duct section
7—fluid connector
8—fluid connector
9—connection piece
10—connection piece
11—hot-forming die
12—lower die
13—upper die
14—die segment
15—die segment
16—contact surface of 12
17—contact surface of 13
18—duct cavity
19—spacer element of 12
20—spacer element of 13
21—holder
22—actuators
23—upper limit stop
24—lower limit stop
25—heating duct of 12
26—heating duct of 13
27—recess
28—vent
29—venting bores
30—edge region
31—activating bar
32—linear drive
A—spaced-apart position
E—removal position
S—closed position
TW—die temperature
x—spacing
x1—spacing

The invention claimed is:

1. A method for producing a heat transfer plate with the following steps:
Providing a plate stack which is constituted from at least two plate elements made from a metal material with a brazing material arranged between the plate elements;
Transferring the plate stack into a heated hot-forming die which has a lower die and an upper die and contact surfaces with at least one duct cavity;
Placing the plate stack inside the hot-forming die, wherein the plate stack is positioned on spacer elements which are arranged so that they can flex in the lower die and project relative to the contact surface of the lower die;
Closing the hot-forming die, wherein the lower die and the upper die are displaced relative to each other;
Continuing the closing movement and clamping the plate stack between the lower die and the upper die, wherein the spacer elements in the lower die are displaced into the lower die and the plate stack comes into surface contact with the lower die and the upper die;
Heating the plate stack; and
Applying an internal pressure to an intermediate space between the plate elements of the plate stack by feeding in an active medium and forming a duct by deforming, using internal pressure, at least one plate element region into the duct cavity, the duct cavity being vented, and
Melting the brazing material between the plate elements and joining by brazing the plate elements at joining surfaces of the plate elements which bear against one another;
Opening the hot-forming die, wherein the lower die and the upper die are displaced relative to each other, wherein the spacer elements in the lower die are moved out from the lower die such that the plate stack is held on the spacer elements in the lower die with a spacing from the lower die;
Holding and cooling the plate stack;
Opening the hot-forming die until it is in a removal position (E) and removing the heat transfer plate from the hot-forming die.

2. The method as claimed in claim 1, wherein, when the hot-forming die is closed, spacer elements arranged in the upper die and which are arranged so that they can flex in the upper die and project relative to the contact surface of the upper die come into contact with the plate stack.

3. The method as claimed in claim 2, wherein the spacer elements in the upper die are displaced into the upper die when the hot-forming die is closed.

4. The method as claimed in claim 2, wherein the spacer elements in the upper die are moved out from the upper die when the hot-forming die is opened.

5. The method as claimed in claim 1, wherein the hot-forming die is heated to a die temperature (TW) between 540° C. and 670° C., in particular between 550° C. and 640° C.

6. The method as claimed claim 1, wherein a plate element is provided with a fluid connector before the plate stack is constituted, the plate elements are provided with a fluid connector during the constitution of the plate stack, or the plate stack is provided with a fluid connector.

7. The method as claimed in claim 6, wherein the active medium is fed in via the fluid connector.

8. The method as claimed in claim 1, wherein during the deformation using internal pressure, the plate stack is sealed peripherally along edge regions which lie on top of one another and/or adjacent to the duct cavity by means of one or more pressure elements.

9. The method as claimed in claim 1, wherein plate elements made from an aluminum alloy are used.

10. The method as claimed claim 1, wherein a plate element is used which is provided with a brazing material in the form of a plated brazing layer.

11. The method as claimed in claim 1, wherein when the plate stack is clamped and held between the lower die and the upper die, at least one oxide layer present on a surface of the plate element is broken up.

12. The method as claimed in claim 1, wherein the joining by brazing is performed flux-free.

13. The method as claimed in claim 1, wherein the spacer elements are displaced automatically or by actuators.

14. The method as claimed in claim 1, wherein a release agent is introduced between the contact surfaces of the hot-forming die and the outer surfaces of the plate elements or the plate stack.

* * * * *